3,093,561
REINFORCEMENT OF RUBBER WITH IRRADIATED CARBON BLACK
Gerard Kraus, Bartlesville, Okla., assignor to Phillips Petroleum Company, a corporation of Delaware
No Drawing. Filed Sept. 17, 1959, Ser. No. 840,520
7 Claims. (Cl. 204—154)

This invention relates to reinforcement of rubber with irradiated carbon black.

Reinforcement of rubber, both natural and synthetic, with carbon black has long been known. However, the search continues for ways to improve the properties of compounded rubber products.

The following are objects of my invention.

An object of this invention is to provide rubber products having a higher cure rate and better physical properties. A further object of this invention is to provide a process for producing said products.

Other objects and advantages of this invention will be apparent to one skilled in the art upon reading the accompanying disclosure.

Broadly, my invention resides in the production of rubber articles containing carbon black as a reinforcing agent, the improvement comprising using black which has been subjected to fast neutron radiation from a nuclear reactor for a total exposure of $1 \times 10^{16}$ to $1 \times 18^{18}$ $nvt$ of neutrons where $nv$ is number of neutrons per square centimeter cross-section per second and $t$ is time in seconds.

To carry out my invention, carbon black is exposed to fast neutron radiation, such as that present in the core of a nuclear reactor, and then employed as a reinforcing agent for rubber. Rubber compounded with the irradiated carbon black and other compounding ingredients such as vulcanizing agent, vulcanization accelerator, accelerator activator, and the like, cures at a higher rate to a more tightly cured composition than corresponding compositions containing carbon black which has not been irradiated.

Both furnace and channel blacks, which are well known reinforcing agents for rubber can be used in the process of my invention. Irradiation is accomplished by placing the carbon black in the core of a nuclear reactor, e.g., the Materials Testing Reactor at Arco, Idaho, where it is subjected to pile radiation. Such radiation consists principally of fast and slow neutrons and gamma rays. By the process of elimination, I have determined that fast neutrons are the effective radiation.

The carbon black is generally irradiated to a total exposure of fast neutrons in the range between $1 \times 10^{16}$ and $1 \times 10^{18}$ $nvt$, preferably in the range between $2 \times 10^{16}$ and $1 \times 10^{17}$ $nvt$. For best operation according to my invention I employ neutrons of at least 0.5 mev. and preferably 1.0 mev. in energy. The upper limit is much higher and is in the range of 10 to 15 mev. and higher.

Any rubber that can be reinforced with carbon black can be employed in this invention, i.e., both natural rubber and synthetic rubber can be used. Conventional compounding ingredients are incorporated into the rubber in addition to the irradiated carbon black and vulcanization is effected by heating at the desired temperature as is well known in the rubber vulcanization art.

Examples of such synthetic rubbery polymers are polymers of one or more conjugated dienes having from 4 to 8 carbon atoms per molecule, such as polybutadiene, polyisoprene, polychloroprene, and the like, and copolymers of such conjugated dienes in a major amount with a minor amount of a copolymerizable monomer containing a $CH_2=C<$ group. Examples of such copolymers are butadiene-styrene copolymers, butadiene-acrylonitrile copolymers, butadiene-isoprene copolymers, and the like. Further examples of copolymerizable monomers which can be used with conjugated dienes are alpha-methylstyrene, halogen-substituted styrenes, alkyl-substituted styrenes, alkoxy-substituted styrenes, 2-vinylpyridine, 5-methyl-2-vinylpyridine, 5-ethyl-2-vinylpyridine, 2-methyl-5-vinylpyridine, 4-methyl-2-vinylpyridine, 2-isopropenylpyridine, 5-propyl-2-isopropenylpyridine, 2-octyl-5-vinylpyridine, methacrylonitrile, methyl acrylate, methyl methacrylate, ethyl acrylate, ethyl methacrylate, ethyl vinyl ketone, methyl isopropenyl ketone, methyl vinyl ether, and the like.

Radiation of the type to which my invention is limited should be distinguished from gamma radiation. I have compounded rubber using black radiated in a pure gamma field to the very high dosage of $2 \times 10^9$ roentgens, this being an amount of energy within the preferred range set forth above for my invention. No appreciable increase in cure rate was noted.

The following examples illustrate my invention but they should not be considered unduly limiting. In each case the control was given the same treatment, except for irradiation as the irradiated black.

*Example 1*

Two furnace blacks, a high abrasion furnace black (Philblack O) and a fast extruding furnace black (Philblack A), were placed in aluminum cylinders three inches long and having an outside diameter of 1⅛ inches. These cylinders were placed in the reactor core of the Materials Testing Reactor at Arco, Idaho where they were subjected to pile radiation which consisted principally of neutrons and gamma rays. Irradiation temperature was approximately 110–120° F. They were irradiated for periods of 2, 6, and 18 hours at a dose rate of 2 watts/gram ($2.2 \times 10^8$ roentgens/hour). Total dosages were $4.4 \times 10^8$, $13.2 \times 10^8$, and $39.6 \times 10^8$ roentgens, respectively. The fast neutron ($>1$ mev.) exposure was $2.02 \times 10^{16}$, $6.06 \times 10^{16}$ and $18.2 \times 10^{16}$ $nvt$, respectively.

Portions of each of the carbon blacks receiving different radiation dosages, and also blacks which had not been irradiated, were used, together with other compounding ingredients, in compounding a 1,3-butadiene/styrene rubber which had been prepared by emulsion polymerization at 41° F. to give a polymer having a raw Mooney value (ML–4) of 52 and a bound styrene content of 23 percent. A typical recipe for the production of a polymer of this type is as follows:

|  | Parts by weight |
|---|---|
| Butadiene | 75 |
| Styrene | 25 |
| Water | 180 |
| Rosin soap, K salt | 4.5 |
| Tamol N [1] | 0.15 |
| $Na_3PO_4 \cdot 12H_2O$ | 0.80 |
| p-Menthane hydroperoxide | 0.12 |
| $FeSO_4 \cdot 7H_2O$ | 0.20 |
| $K_4P_2O_7$ | 0.30 |
| tert-Dodecyl mercaptan, as required for a 52 ML–4 rubber. | |

[1] Sodium salt of a naphthalene sulfonic acid condensed with formaldehyde.

The rubber was compounded in accordance with the following formulation:

|  | Parts by weight |
|---|---|
| Butadiene/styrene rubber | 100 |
| Carbon black | 40 |
| ZnO | 3 |
| Stearic acid | 2 |
| Flexamine [1] | 1 |
| Sulfur | 1.75 |
| Santocure [2] | 1 |

[1] Physical mixture containing 65 percent of a complex diarylamine-ketone reaction product and 35 percent of N,N'-diphenyl-p-phenylenediamine.
[2] N-cyclohexyl-2-benzothiazylsulfenamide.

The carbon black was incorporated into the rubber first using a Baker-Perkins mixer, 40 minutes being required for the mixing. An internal mixer was used in order to prevent the escape of irradiated carbon black particles. Other compounding ingredients were added on a cold roll mill to the rubber-carbon black composition. Controls were mixed in the same way for the sake of uniformity. The stocks were cured at 307° F. for 15, 30, and 45 minutes and the cure rate was determined. Results were as follows:

| Carbon black | Irradiation, hours | Fast neuton exposure, $nvt$ | Cure rate $\nu \times 10^4$ [1] | | |
|---|---|---|---|---|---|
| | | | 15 min. | 30 min. | 45 min. |
| Philblack O | 0 | | 1.27 | 1.67 | 1.67 |
| | 2 | $2.02 \times 10^{16}$ | 1.40 | 1.74 | 1.75 |
| | 6 | $6.06 \times 10^{16}$ | 1.70 | 1.88 | 1.88 |
| | 18 | $18.2 \times 10^{16}$ | 1.58 | 1.82 | 1.82 |
| Philblack A | 0 | | 1.23 | 1.61 | 1.73 |
| | 2 | $2.02 \times 10^{16}$ | 1.42 | 1.73 | 1.75 |
| | 6 | $6.06 \times 10^{16}$ | 1.50 | 1.76 | 1.76 |
| | 18 | $18.2 \times 10^{16}$ | 1.80 | 1.95 | 1.94 |

[1] Number of network chains per unit volume of rubber as determined from swelling measurements, described by Kraus in Rubber World, 135, No. 1, 67–73 (1956) and 135, No. 2, 254–260 (1956).

The data on cure rate show that the stocks containing irradiated carbon black cured at a faster rate than those containing unirradiated black. A tighter cure is also obtained when irradiated blacks are used.

*Example II*

The procedure of Example I was repeated using a channel black (Wyex) and rubber of Example I was compounded and cured as in Example I. Data for 0, 2, and 6 hours irradiation of the black were obtained. Results were as follows:

| Fast neutron exposure, $nvt$ | Irradiation, hours | Cure rate $\nu \times 10^4$ | | |
|---|---|---|---|---|
| | | 15 min. | 30 min. | 45 min. |
| | 0 | 0.91 | 1.53 | 1.65 |
| $2.06 \times 10^{16}$ | 2 | 1.26 | 1.64 | 1.73 |
| $6.06 \times 10^{16}$ | 6 | 1.17 | 1.82 | 1.87 |

These data show the same faster cure rate and tighter cure for the irradiated black.

*Example III*

The effect of pile radiation, as described in Example I, on pH of furnace black (Philblack O) and channel black (Wyex) was determined. Samples of unirradiated black and that which had been irradiated for 2, 6, and 18 hours in the manner described in Example I were tested. Twenty-five cc. of freshly boiled water was added to 0.5 gram of black and the suspension was boiled for 10 minutes after which it was allowed to come to room temperature. pH measurements were taken on the slurry. Results were as follows:

| Carbon black | Irradiation, hours | Fast neutron exposure, $nvt$ | pH |
|---|---|---|---|
| Philblack O | 0 | | 8.1 |
| | 2 | $2.02 \times 10^{16}$ | 7.9 |
| | 6 | $6.06 \times 10^{16}$ | 7.2 |
| | 18 | $18.2 \times 10^{16}$ | 7.0 |
| Wyex | 0 | | 5.6 |
| | 2 | $2.02 \times 10^{16}$ | 5.3 |
| | 6 | $6.06 \times 10^{16}$ | 4.5 |

These data show that there is a decrease in pH of the black as a result of irradiation.

Ordinarily as the pH of a black is decreased, the rubber (natural and synthetic) cures at a lower rate. One of the unexpected results obtained in this invention is that faster cures are obtained with lower pH blacks, i.e., with blacks that have been subjected to pile radiation.

*Example IV*

Philblack O was irradiated in a neutron field as described in Example I to a total exposure of $6.06 \times 10^{16}$ $nvt$ and then employed in the following rubber formulation:

| | Parts by weight |
|---|---|
| Butadiene/styrene rubber | 100 |
| Philblack O | 40 |
| ZnO | 3 |
| Stearic acid | 2 |
| Flexamine | 1 |
| Sulfur | 1.75 |
| Santocure | 0.7 |

Controls were run using unirradiated black. The compounds were cured at 307° F. using a cure time of either 15 or 45 minutes. Results were as follows:

| Cure time, min. | Neutron irradiation | Tensile, p.s.i. | Elongation, percent |
|---|---|---|---|
| 15 | No | 3,030 | 730 |
| | Yes | 3,280 | 820 |
| 45 | No | 3,770 | 550 |
| | Yes | 4,180 | 620 |

These runs show increased tensile and increased elongation for the stocks containing the irradiated black.

*Example V*

A series of runs was made using the compounding recipe of Example IV. Philblack O was irradiated as described in Example I to total exposures of $6.06 \times 10^{16}$ and $18.2 \times 10^{16}$ $nvt$. Rubber compounds were prepared using both irradiated and unirradiated black.

The compounded stocks were cured 30 minutes at 307° F. and physical properties determined. Results were as follows:

| Fast neutron exposure, $nvt$ | Tensile, p.s.i. | Elongation, percent |
|---|---|---|
| | 3,450 | 590 |
| $6.06 \times 10^{16}$ | 4,080 | 670 |
| $18.2 \times 10^{16}$ | 4,010 | 620 |

These runs show increased tensile and increased elongation for the stocks containing the irradiated black.

Physical properties of blacks such as those used in the above work are set forth in the following table:

| | Surface area, sq. m./gm. | pH | Oil adsorption, cc./gm. |
|---|---|---|---|
| Philblack O | 75.1 | 8.4 | 1.18 |
| Philblack A | 45.6 | 7.5 | 1.23 |
| Wyex | 114.2 | 3.7 | 1.11 |

My work has not indicated that time of use after treatment is an important factor. Several weeks elapsed between irradiation and use in the data reported above.

As many possible embodiments can be made of this invention without departing from the scope thereof, it is to be understood that all matter herein set forth is to be interpreted as illustrative and not as unduly limiting the invention.

I claim:

1. In the production of rubber articles containing carbon black as a reinforcing agent, the improvement comprising incorporating in the rubber carbon black which has been subjected prior to incorporation in the rubber to fast neutron radiation from a nuclear reactor for a total exposure of $10^{16}$ to $10^{18}$ $nvt$ where $nv$ is the number of neutrons per centimeter cross-section per second and $t$ is the time in seconds.

2. In the production of rubber articles containing carbon black as a reinforcing agent, the improvement comprising incorporating in the rubber carbon black which has been subjected prior to incorporation in the rubber to fast neutron radiation from a nuclear reactor for a total exposure of $2 \times 10^{16}$ to $5 \times 10^{17}$ $nvt$ where $nv$ is the number of neutrons per centimeter cross-section per second and $t$ is the time in seconds.

3. The process of claim 1 wherein said rubber is a rubbery butadiene/styrene copolymer.

4. A composition of matter comprising a cured rubber article containing carbon black as a reinforcing agent, said carbon black, prior to its incorporation in the rubber, having been subjected to fast neutron radiation from a nuclear reactor for a total exposure of $10^{16}$ to $10^{18}$ $nvt$ where $nv$ is the number of neutrons per centimeter cross-section per second and $t$ is the time in seconds.

5. A composition of matter comprising a cured rubber article containing carbon black as a reinforcing agent, said carbon black, prior to its incorporation in the rubber, having been subjected to fast neutron radiation from a nuclear reactor for a total exposure of $2 \times 10^{16}$ to $5 \times 10^{17}$ $nvt$ where $nv$ is the number of neutrons per centimeter cross-section per second and $t$ is the time in seconds.

6. The composition of claim 4 wherein said rubber is a rubbery butadiene/styrene copolymer.

7. The composition of claim 4 wherein said rubber is natural rubber.

References Cited in the file of this patent

Ballantine et al.: "Progress Report on Fission Products Utilization VIII," Brookhaven National Laboratory, Upton, New York (May 1956), pages 18–19.

Kuzminskii et al.: "Some Aspects of the Vulcanization of Rubber by Irradiation," J. Nuclear Energy II, volume 4, pages 270–272 (1957), Pergamon Press Ltd., London.